Jan. 24, 1939.  A. SALINGER  2,144,897
FASTENING DEVICE
Filed April 8, 1938
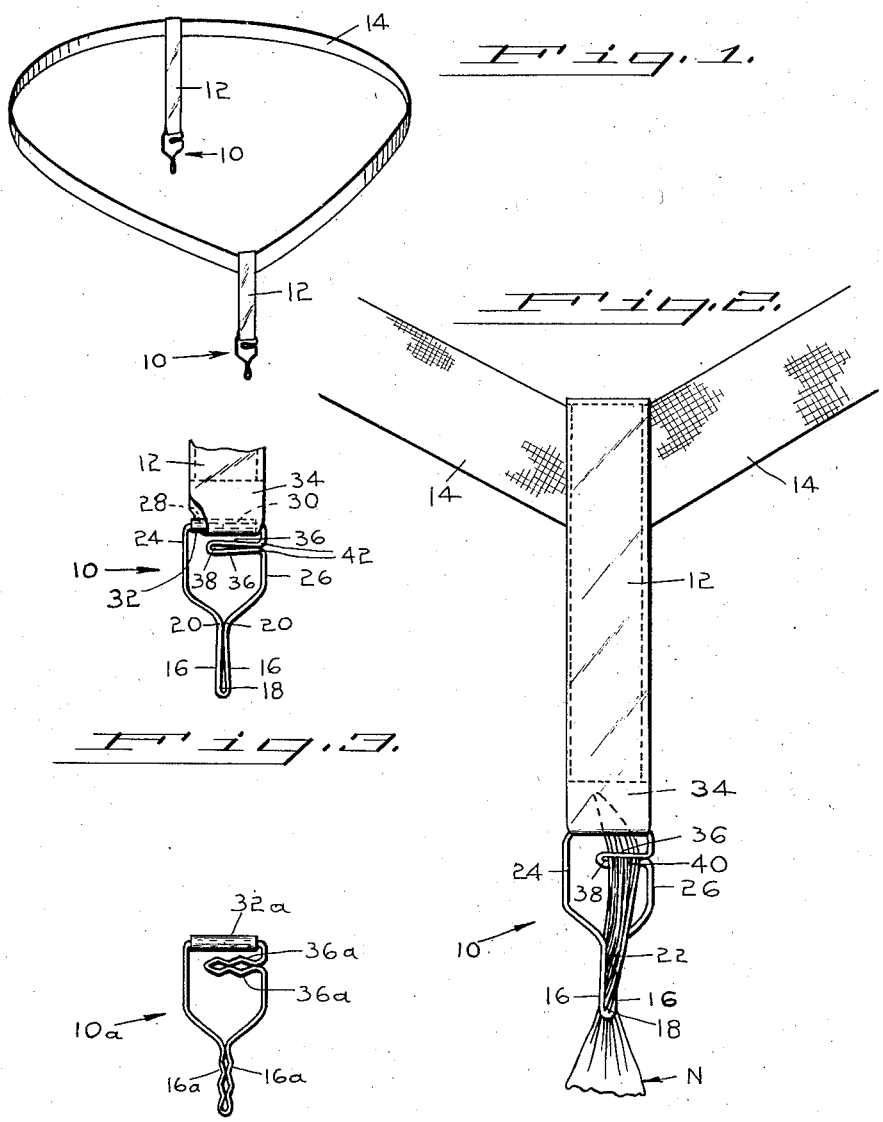
Inventor
ARTHUR SALINGER.
By Erwin Levisohn
Attorney Patented Jan. 24, 1939

2,144,897

UNITED STATES PATENT OFFICE 2,144,897

FASTENING DEVICE

Arthur Salinger, Bronxville, N. Y., assignor to I. B. Kleinert Rubber Company, New York, N. Y., a corporation of New York Application April 8, 1938, Serial No. 200,817

3 Claims. (Cl. 24—264)

This invention relates to fastening or holding devices and more particularly to such devices intended primarily for use in fastening articles of wearing apparel or other articles, as for example sanitary napkins, to suspending straps or parts of supporting means.

One object of the invention is to provide fastening devices of the character described which are of simple construction and arranged to facilitate the attachment of the napkin or other article thereto and to provide a more secure fastening of the article.

Another object of the invention is to provide a fastening device of the class described, which may be easily made from suitable metal wire whereby the fastener can be bent into shape by simple mechanical operations to provide therein means for obtaining the desired fastening elements.

A further object of the invention is to provide a fastening device with a plurality of gripping portions arranged in such manner as to avoid increasing the overall size of the device.

A yet further object of the invention is generally to improve the construction of fastening device of the character described whereby to provide added security in the attachment of the article fastened thereby.

The above objects of the invention and other objects which might hereinafter appear will be fully understood from the following description considered with reference to the accompanying drawing.

In the drawing:

Fig. 1 is a perspective view of a belt provided with fastening devices embodying the present invention;

Fig. 2 is a view, on a larger scale, of part of the belt and of the fastening device attached thereto, showing an end portion of an article, such as a napkin, secured in position;

Fig. 3 is a view of the fastening device, with part of the strap loop cut away, for the sake of clearness in illustration;

Fig. 4 is a view of a fastener made in accordance with another form of the present invention.

Referring now to the drawing in detail, the fastening devices 10 embodying the present invention are shown in Figs. 1 and 2 as attached to the suspending straps 12 of a belt 14. The belt 14 and the straps 12 attached thereto may be of any desired form or construction, and it will also be understood that the fasteners 10 may be utilized in connection with other support or suspending means.

As illustrated in Figs. 2 and 3, the fastening devices 10 made in accordance with the present invention comprises a loop bent into shape from suitable wire, preferably spring metal wire. Said wire loop has a constricted projecting end part formed by adjacent portions 16 of the loop defining a narrow slot 18. Portions 16 are preferably shaped so that they engage each other resiliently, as indicated at 20, whereby the part 22 of the napkin or other article N is gripped by said slot-defining portions when said part of the napkin is received in said slot. The wire loop is provided with spaced arms 24 and 26 provided with inturned end portions 28 and 30 which are received within a small metal tube 32 which holds said end portions against separation. Said tube 32 is received in the strap loop 34 for suspending the fasteners 10 from strap 12.

In accordance with the present invention, fastener 10 is provided with means, additional to the projecting end part formed by adjacent portions 16, for improving the securement of the article attached to the fastener. For this purpose arm 26 has an intermediate portion thereof bent to provide adjacent portions 36 disposed in the same relation to each other as portions 16, and like the latter define a slot 38. A part 40 of the napkin or other article is received and gripped by the opposed portions 42 of slot defining portions 36. As here shown, said portions 36 extend from the arm 26 toward the arm 24, preferably in the same plane with said arm portions, whereby the slot 38 is a re-entrant slot. While slots 18 and 38 have parts 20 and 42, respectively, which are preferably close to each other or in abutting relation when the end of the napkin is not in place, whereby to more securely grip the napkin on the part when received in said slots, the latter are each open at one end thereof adjacent said abutting portions whereby to facilitate insertion of the napkin in each of said slots.

In the form of the invention illustrated in Fig. 4, the fastener 10a is substantially of the same construction as the fastener 10, with the exception that the slot defining parts 16a of the projecting end part, and the parts 36a which define the reentrant slot are crimped more or less as illustrated for more securely gripping the inserted end portion of the napkin or other article.

While I have shown and described the preferred embodiment of my invention, it will be understood that the latter may be embodied otherwise than as here shown. Therefore, I do not wish to be limited precisely to the construction herein shown or described except as may be required by the appended claims and the prior art.

Having thus described my invention, what I claim and desire to secure by Letters Patent is:

1. A fastener of the class described comprising a wire loop having two spaced arms, a constricted projecting end part formed by adjacent portions of said two arms of the loop, defining a narrow slot for receiving part of a napkin or other article gripped between said adjacent portions of the loop, said arm having inturned confronting end portions, a tubular member within which said end portions are received and forming means for attaching a supporting strap and said loop also having a constricted re-entrant part formed by adjacent portions of the loop in one of said arms between said projecting part and said inturned end portions, said last mentioned adjacent portions defining a re-entrant slot open at one side of said loop in said one arm thereof for receiving and resiliently gripping an end portion of said napkin or article part gripped between said last mentioned slot-defining portions.

2. A fastener of the class described comprising a wire loop having a constricted projecting end part formed by adjacent portions of the loop, said loop portions defining a narrow slot for receiving part of a napkin or other article gripped between said adjacent portions of the loop, said loop having spaced arms diverging laterally from said slot defining portions, one of said arms having an intermediate part thereof bent to provide adjacent portions extending toward said other arm between the ends thereof and defining a slot for receiving and resiliently gripping an end portion of said napkin or article part gripped between said last mentioned slot-defining portions, said last mentioned slot being open at one end thereof at said one arm and closed at its other end only by the bend thereat.

3. A fastener of the class described comprising a wire loop having at one end thereof inturned end portions of the attachment thereto of a supporting strap and having at its opposite end a constricted projecting part formed by adjacent portions of the loop, said loop portions defining a narrow slot for receiving part of a napkin or other article gripped between said adjacent portions of the loop, said loop having spaced arms formed as continuations of said slot defining portions, and diverging laterally from the latter one of said arms having an intermediate part thereof bent to provide adjacent portions extending toward said other arm between the ends of the latter and defining a re-entrant slot in said loop extending transversely of the direction of said first mentioned slot for receiving and resiliently gripping an end portion of said napkin or article part gripped between said last mentioned slot-defining portions, said re-entrant slot being open at one end thereof in said one arm and closed at its other end only by the bend thereat.

ARTHUR SALINGER.